(12) United States Patent
Bluethgen et al.

(10) Patent No.: US 8,319,776 B2
(45) Date of Patent: *Nov. 27, 2012

(54) INFORMATION TRANSFER SYSTEM, A TRANSMITTER, A RECEIVER AND A RECORD CARRIER FOR USE IN THE SYSTEM

(75) Inventors: Bjorn Bluethgen, Celle (DE); Richard Cees Spiero, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 435 days.

This patent is subject to a terminal disclaimer.

(21) Appl. No.: 12/565,806

(22) Filed: Sep. 24, 2009

(65) Prior Publication Data

US 2010/0014836 A1      Jan. 21, 2010

Related U.S. Application Data

(62) Division of application No. 10/685,358, filed on Oct. 14, 2003, now Pat. No. 7,696,999.

(51) Int. Cl.
*G09G 5/00* (2006.01)
*G06F 3/02* (2006.01)
*G06T 11/00* (2006.01)

(52) U.S. Cl. ............................ 345/467; 345/169
(58) Field of Classification Search .......... 345/156–159, 345/467–469; 370/110–111
See application file for complete search history.

(56) References Cited

U.S. PATENT DOCUMENTS

| 4,005,388 A | 1/1977 | Morley et al. |
| 4,931,987 A | 6/1990 | Kawakami |
| 5,111,426 A | 5/1992 | Bergstresser et al. |
| 5,218,187 A | 6/1993 | Koenck et al. |

FOREIGN PATENT DOCUMENTS

| EP | 0325325 A2 | 5/1989 |
| EP | 0389689 A1 | 3/1990 |
| EP | 0432056 | 6/1991 |
| EP | 0464482 A3 | 1/1992 |

*Primary Examiner* — Srilakshmi K Kumar (57) ABSTRACT

A record carrier stores information readable by a processor, where the information includes main data and sub data. The sub data includes coded text lines having a plurality of character codes, where the coded text lines includes control codes for controlling the processor to display characters representing the coded text lines on a display unit configured to display at least one line of characters. The at least one line has a predetermined number character positions which is less than a number of characters in the coded text lines. A selected number of the character codes are displayable at the predetermined number of character positions of the at least one line.

11 Claims, 7 Drawing Sheets

FIG. 1

Byte 0 : LANGUAGE NUMBER, APPLICATION CODE

-bit 6-4 = LANGUAGE .NUMBER

000 Language-independent text, or only one language is provided.
001 Main language if various languages are recorded.
010 ⎫
||| ⎬ Additional language
111 ⎭

-bit 3-0 = APPLICATION CODE

0000 Text Packet for 2-line and 21-line displays, based on a 40-character per line font.
1000 As "0000", but also for 1-line displays.

FIG. 3

|   | 7 | 6 | 5 | 4 | 3 | 2 | 1 | 0 |
|---|---|---|---|---|---|---|---|---|
| 0 | 1 | L N | | | | | | A C |
| 1 | | | | | | | | |
| 2 | | | | | | | | |
| 3 | 0 | 0 | 0 | 0 | 0 | 0 | 0 | 1 |
| 4 | TC | | | | | | | |
| 5 | 21 PC | | | | | 2PC | | |
| 6 | | | | | | | | |
| 7 | 0 | 0 | 0 | 0 | 0 | 0 | 0 | 0 |
| 8 | TLC Φ | | | | | | | |
| ⋮ | | | | | | | | |
| 47 | TLC 40 | | | | | | | |

FIG.2

| Col/Row | | 1 Line Display Control codes |
|---|---|---|
| 11 | S | Start code |
| 15 | P | Pause code |
| 19 | H0 | Scroll, default speed |
| 1A | H1 | Scroll, speed 2 |
| 1B | H2 | Scroll, speed 3 |
| 1C | H3 | Scroll, speed 4 |

FIG.4

| | 0x | 1x | 2x | 3x | 4x | 5x | 6x | 7x | 8x | 9x | Ax | Bx | Cx | Dx | Ex | Fx |
|---|---|---|---|---|---|---|---|---|---|---|---|---|---|---|---|---|
| x0 | | | | 0 | @ | P | ` | p | | | | | | | | |
| x1 | | | ! | 1 | A | Q | a | q | | | | | | | | |
| x2 | | | | | | | | r | | | | | | | | |
| x3 | | | | | | | | s | | | | | | | | |
| x4 | | | | | | | | t | | | | | | | | |
| x5 | CONTROL CODES | | | | | | | u | | | | | | | | |
| x6 | | | | | | | | v | | | | | | | | |
| x7 | | | | | | | | w | | | | | | | | |
| x8 | | | OTHER CHARACTERS | | | | | x | | | SPECIAL CHARACTERS | | | | | |
| x9 | | | | | | | | y | | | | | | | | |
| xA | | | | | | | | z | CONTROL CODES | | | | | | | |
| xB | | | | | | | | { | | | | | | | | |
| xC | | | | | | | | \| | | | | | | | | |
| xD | | | | | | | | } | | | | | | | | |
| xE | | | | | | | | ~ | | | | | | | | |
| xF | | | | | | | | ▯ | | | | | | | | |

FIG.9

TAPE FRAME (N):

| | |
|---|---|
| 8 bytes Sysinfo header | $SI_0$ – $SI_7$ |
| 8 bytes packet header | $SI_8$ – $SI_{15}$ | ⎤ Packet 1
| 40 bytes Coded text line | $SI_{16}$ – $SI_{55}$ | ⎦ Packet 1
| 8 bytes packet header | $SI_{56}$ – $SI_{63}$ | ⎤ Packet 2
| 40 bytes of coded text line | $SI_{64}$ – $SI_{103}$ | ⎦ Packet 2
| 8 bytes packet header | $SI_{104}$ – $SI_{111}$ | ⎤ Packet 3
| 16 bytes of bytes of coded text line | $SI_{112}$ – $SI_{127}$ | ⎦ Packet 3

TAPE FRAME (N+1):

| | |
|---|---|
| 8 bytes Sysinfo header | $SI_0$ – $SI_7$ |
| 24 bytes of coded text line | $SI_8$ – $SI_{31}$ | Packet 3
| 8 bytes packet header | $SI_{32}$ – $SI_{39}$ | ⎤ Packet 4
| 40 bytes of coded text line | $SI_{40}$ – $SI_{79}$ | ⎦ Packet 4
| 8 bytes packet header | $SI_{80}$ – $SI_{87}$ | ⎤ Packet 5
| 40 bytes of coded text line | $SI_{88}$ – $SI_{127}$ | ⎦ Packet 5

INFORMATION TRANSFER SYSTEM, A TRANSMITTER, A RECEIVER AND A RECORD CARRIER FOR USE IN THE SYSTEM

This is a Divisional of U.S. application Ser. No. 10/685,358 filed Oct. 14, 2003, which is a continuation of U.S. application Ser. No. 10/273,058 now U.S. Pat. No. 6,693,636 issued Feb. 17, 2004, which is a continuation of U.S. application Ser. No. 08/368,740 now U.S. Pat. No. 6,480,197 issued Nov. 12, 2002, which is a continuation of U.S. application Ser. No. 08/015,098 now abandoned and is incorporated by reference herein.

The invention relates to an information transfer system, comprising a receiver and a transmitter for transferring an information signal to the receiver via a transfer medium, the information signal comprising main data and sub data, the sub data comprising coded text lines having a plurality of character codes, the receiver being provided with a character display unit for displaying characters defined by the character codes in the coded text lines, which display unit has a predetermined number of character display positions.

The invention further relates to a transmitter, a receiver and a record carrier for use in the system.

A system as described in the opening paragraph is inter alia known from EP-A-0,325,325. In this patent application a system is described in which the information signal is transferred via a record carrier, e.g. a Compact Disc or a digital audio tape, to an audio player. The player is provided with at least one multi-line display unit for displaying text lines defined by the coded text lines included in the sub data transferred. The number of character positions (digits) of the display unit is sufficient to display a full text line of forty characters. By means of the system additional information related to the main (audio) information reproduced can be displayed.

The full line display units are less suitable when small sized receivers, such as e.g. portable players and car radios, are used in the system, because in general there is not enough space available for such full line display units. Full line display units are also less suitable to be used on the remote controllers of the receivers. On the other hand it is also desirable that on that type of receivers and remote controllers additional information related to the reproduced main information can be displayed.

It is on object of the invention to provide means which enables that significant parts of the text information available in the sub data can also be shown on display units on small-sized receivers and remote controllers without the requirement of far-reaching amendments in the sub data format.

According to the invention this object is achieved for a system described in the openings paragraph which is characterized in that said predetermined number of character positions of the display unit is less than the number of character codes in the coded text lines, in that the coded text lines include control codes, the receiver being provided with display control means for controlling the display of characters corresponding to the character codes included in the coded text line in dependence on the said control codes.

In the system according the invention the information already available in the coded text lines included in the sub data for displaying on a full line display unit, can also be used for the display on a small sized display unit with a limited number of character positions. This has the advantage that the addition of coded text to the sub data for exclusive use in combination with a 1-line display with a limited number of digits is not required.

An embodiment of the system is characterized in that the receiver is provided with means for storing received coded text lines into a memory, and in that the control codes comprises horizontal scrolling control codes, the display control means of the receiver being adapted to initiate in response to the horizontal control codes a horizontal scroll of the characters of the coded text line stored in the memory.

By using a combination of a memory and a scroll function a presentation of the contents of a complete coded text line is possible.

A further embodiment of the system is characterized in that the receiver is provided with entry means for manually entering scroll commands, the display control means being adapted to control the scrolling in dependence on the entered scroll commands.

This embodiment has the advantage that the user himself can initiate a scroll of the coded text line stored in the memory each time when he finds this desirable.

A further embodiment of the system is characterized in that the display control means are adapted to scroll the characters with a speed dependent on the scrolling control codes or the entered scrolling commands.

This embodiment enables an adaptation of the scrolling speed on specific circumstances.

An other embodiment of the system is characterized in that the control codes comprises marking codes for marking groups of characters, the display control means being provided with means for selecting the character codes for which corresponding characters are to be displayed on the basis of the marking codes.

This embodiment enables the presentation of the most significant words of a message on the display.

Preferably the groups of characters (character strings) to be displayed are placed between a start code and a pause code. In that event it is preferred to use a system, characterized in that the display control means are adapted to cause a display of a space-type character in response to a pause code, whilst no display of corresponding character is caused for the start codes.

This embodiment enables a very suitable separation on the display unit between character strings which are not subsequent in the message defined by the coded text line.

A further embodiment of the system is characterized in that the sub information comprise text packets, each text packet comprise a coded text line and additional control codes, a part of the text packets comprises an indicating control code indicating that the corresponding packet comprises a coded text line with text information to be displayed on the display unit with the limited display positions, the receiver is provided with means for preselecting text packets having a indicating control code, and means for exclusively supplying preselected text packets to the display control means.

By the use of the pre-selection it is prevented that the display control means makes unnecessary searches in coded control lines which does not include characters to be displayed on the 1-line display unit.

The invention will now be described in more detail, by way of example, with reference to the accompanying drawing, in which.

Figure 1:
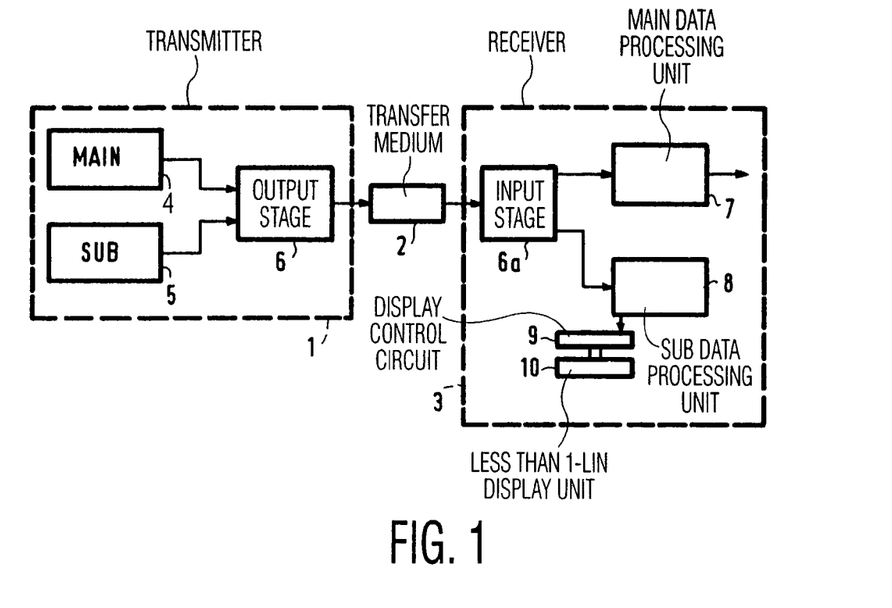
FIG. 1 shows an embodiment of the system according to the invention.

FIG. 1 shows, by way of example, an embodiment of an information transfer system according to the invention. The system comprises a transmitter 1 for transferring an information signal to a receiver 3 via a transfer medium 2. The transmitter 1 comprises a usual source 4 of main data, e.g. digital audio information. The transmitter 1 further comprises a source 5 of sub data related to the main information. The sub data comprises coded text lines and additional control codes. The main data and sub data are supplied to an output stage 6 which transfers the main and sub data in a suitable signal format to the transfer medium 2. The receiver 3 comprises an input stage 6a for receiving the information signal transferred via the transfer medium 2. The input stage 6a separates the main data and sub information. The main data is supplied to a main data processing unit 7 of a usual type for processing the main data. The sub data is supplied to a sub data processing unit 8 for processing the sub data. The sub data processing unit supplies coded text lines and corresponding control codes to a display control circuit 9 of a 1-line display unit 10 having a limited number of character positions (digits), e.g. a 12-digit display unit. The display control circuit 9 controls the display of characters defined by character codes included in the coded text lines in dependence on control codes also included in the coded text lines.

Figure 5:
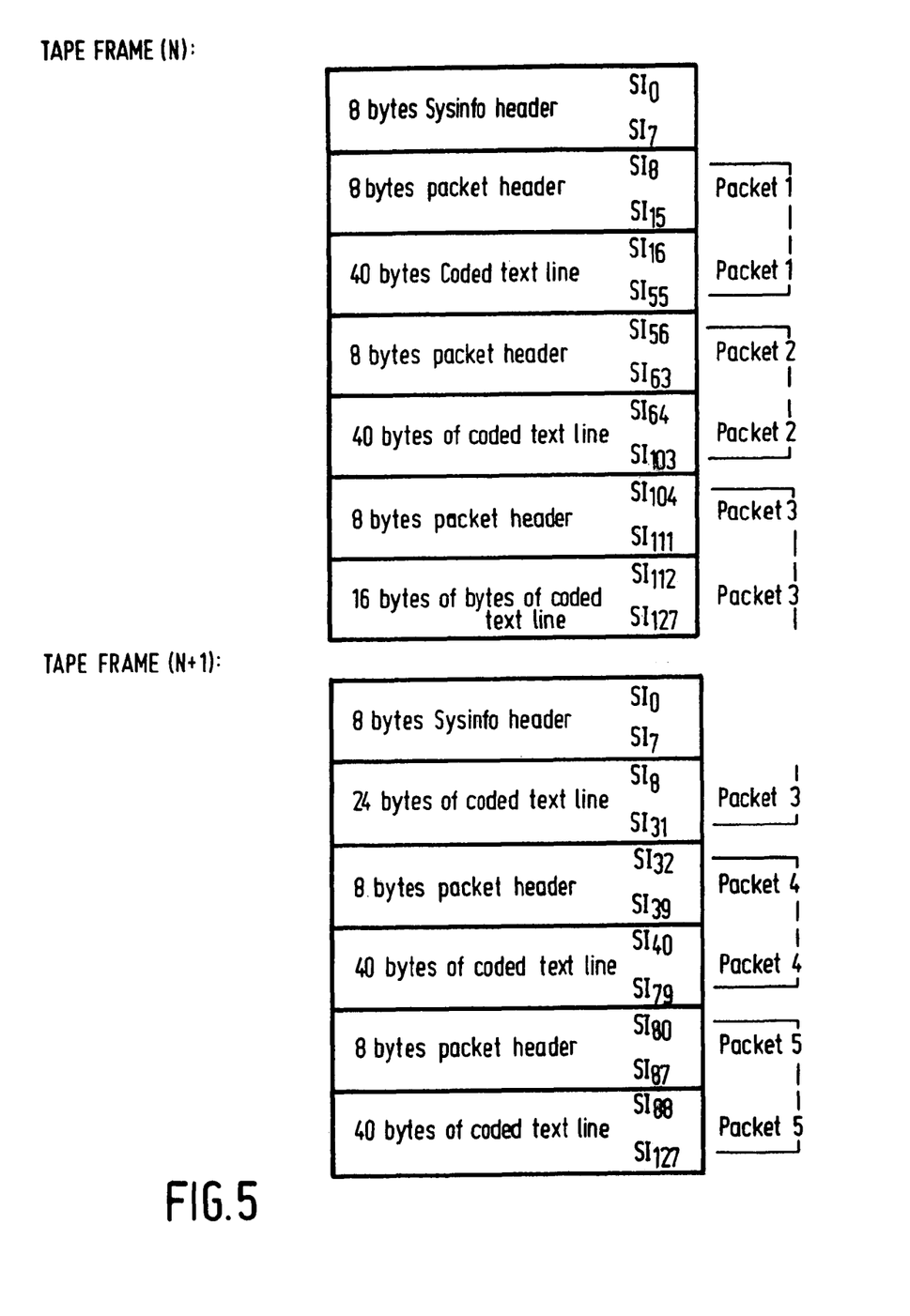
FIG. 5 shows, by way of example, how the packets can be incorporated in the sub data of a digital compact cassette.

The information transfer system can be of type in which the sub data is arranged in packets. In these packets coded text lines can be included. Packets including a coded text line will be indicated as text packets hereinafter. Each coded text line consists of a sequence of a predetermined number of codes. According to the invention the coded text lines comprises character codes defining a character to be displayed and control codes for controlling the display of character strings on a 1-line display with a number of digits which is not sufficient to display a complete text line at once. The control codes included in the coded text line will be indicated as serial control codes hereinafter. The packets may further comprise additional codes not included in the code text line. These control codes will be indicated as parallel control codes hereinafter. A suitable format of the packets is described in detail in EP-A-0,325,325 and EP-A-0,389,689 which documents herewith are incorporated in the description by reference. The transfer medium may be a Compact Disc on which digital main (audio) data is recorded and in which the packets with coded text lines are included in the so-called R to W subcode channels. The transfer medium may also be formed by a so-called Digital Compact Cassette in which main data, in the form of compressed audio information, and sub data are recorded on a magnetic tape. The packets including the coded text lines may be included in the sub data recorded on the Digital Compact Cassette. For a more detailed description of a digital compact cassette system reference is made to EP-A 0,436,991 (PHN13209), which document is herewith incorporated in the description by reference. FIG. 5 shows, by way of example, how packets can be incorporated in the sub data format of the Digital Compact Cassette-system described in EP-A 0,436,991 (PHN13209).

The transfer medium 3 may also be formed by a digital audio broadcast channel via which a digital audio signal and packets including coded text lines are transferred. For a more detailed description of such broadcast system reference is made to EP-A-0,389,689.

Figure 2:
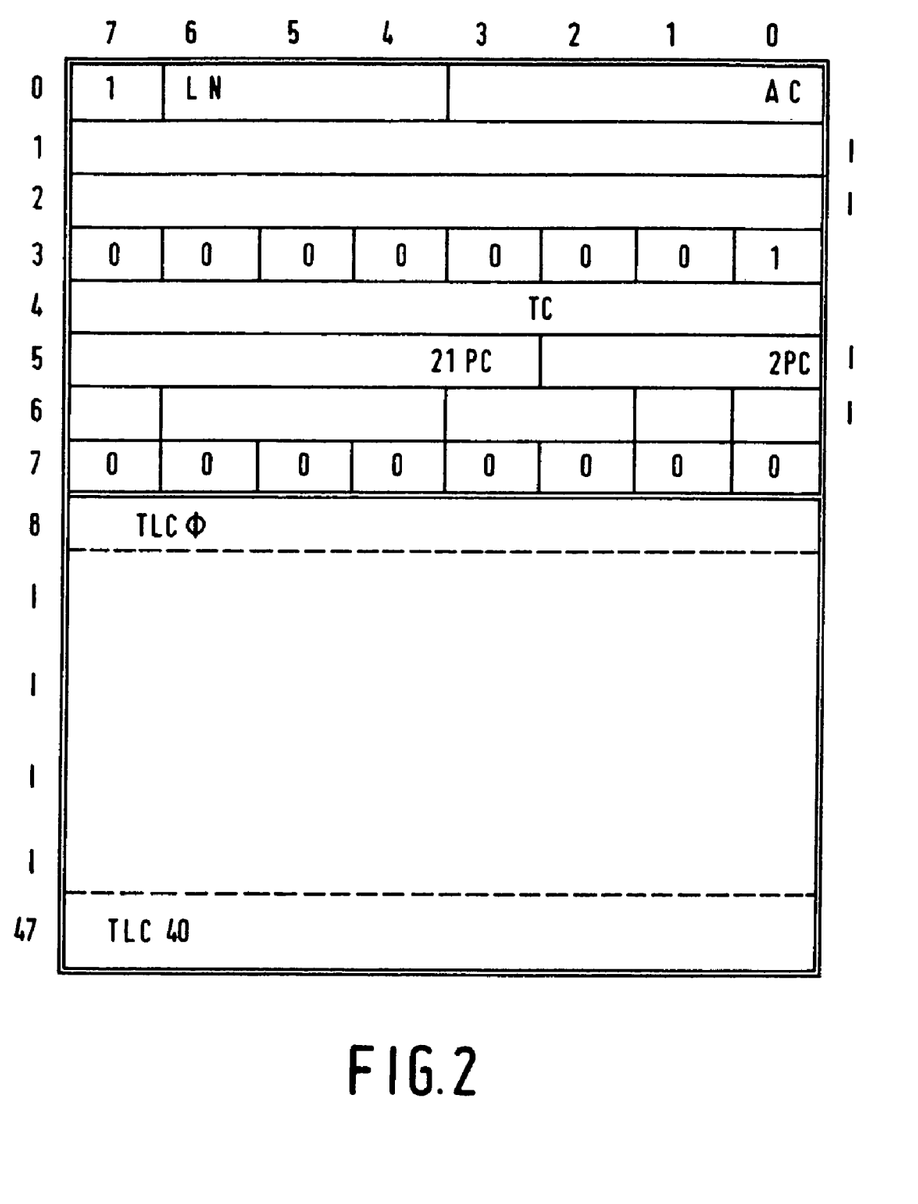
FIG. 2 shows a suitable format of packets for transferring the coded text lines.
Figure 3:
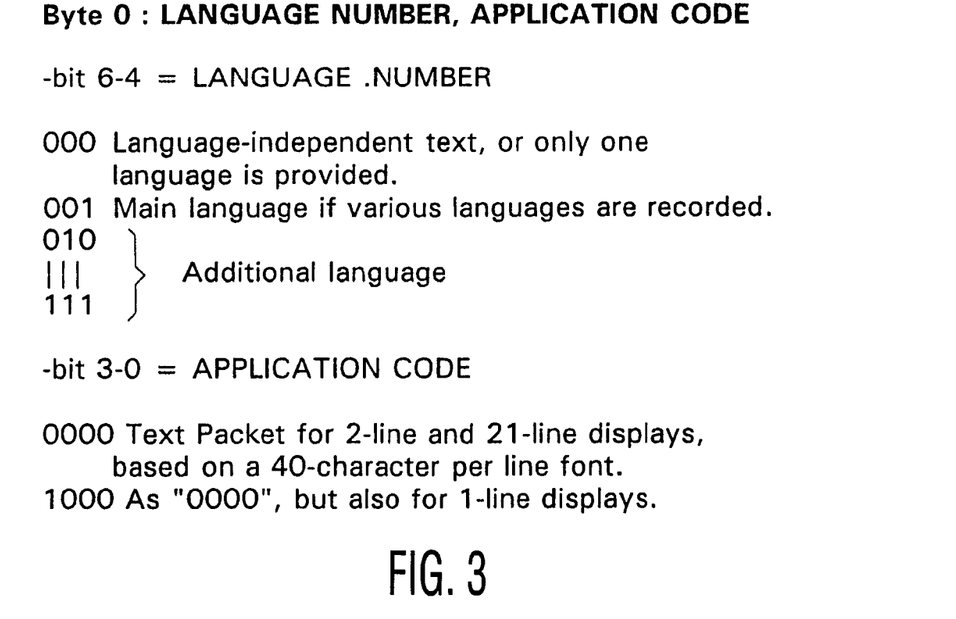
FIG. 3 shows an example of parallel control codes included in the packets.

FIG. 2 shows a suitable format of a text packet. The text packet shown comprises forty eight bytes of eight bits each. The first eight bytes are used for the transfer of parallel control codes. The parallel control codes comprise positions codes 21PC and 2PC. The position code 21PC indicates the line position on which the corresponding text line is to be displayed on a 21-lines display. The position code 2PC indicates the line position of the corresponding text line in the event a 2-line display is used. The parallel control codes comprise three control codes which are used for selecting specific text packets from the text packets received. These control codes are indicated as LN (language number), AC (application code) and TC (topic code). The code LN indicates the language of the coded text in the corresponding text packet. The code AP indicates whether the coded text line comprises information to be displayed on the 1-line display unit 10. The code TC indicates the topic to which the corresponding text line relates. Such topics may be e.g. "Album Information", "Performers name" or "The text of the reproduced song".

Figure 4:
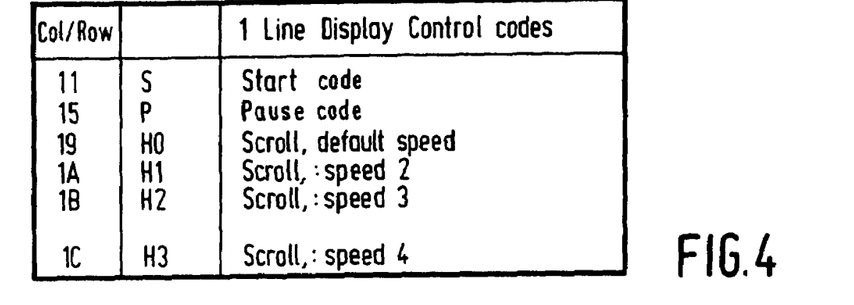
FIG. 4 shows examples of serial control codes which may included in the coded text lines.
Figure 9:
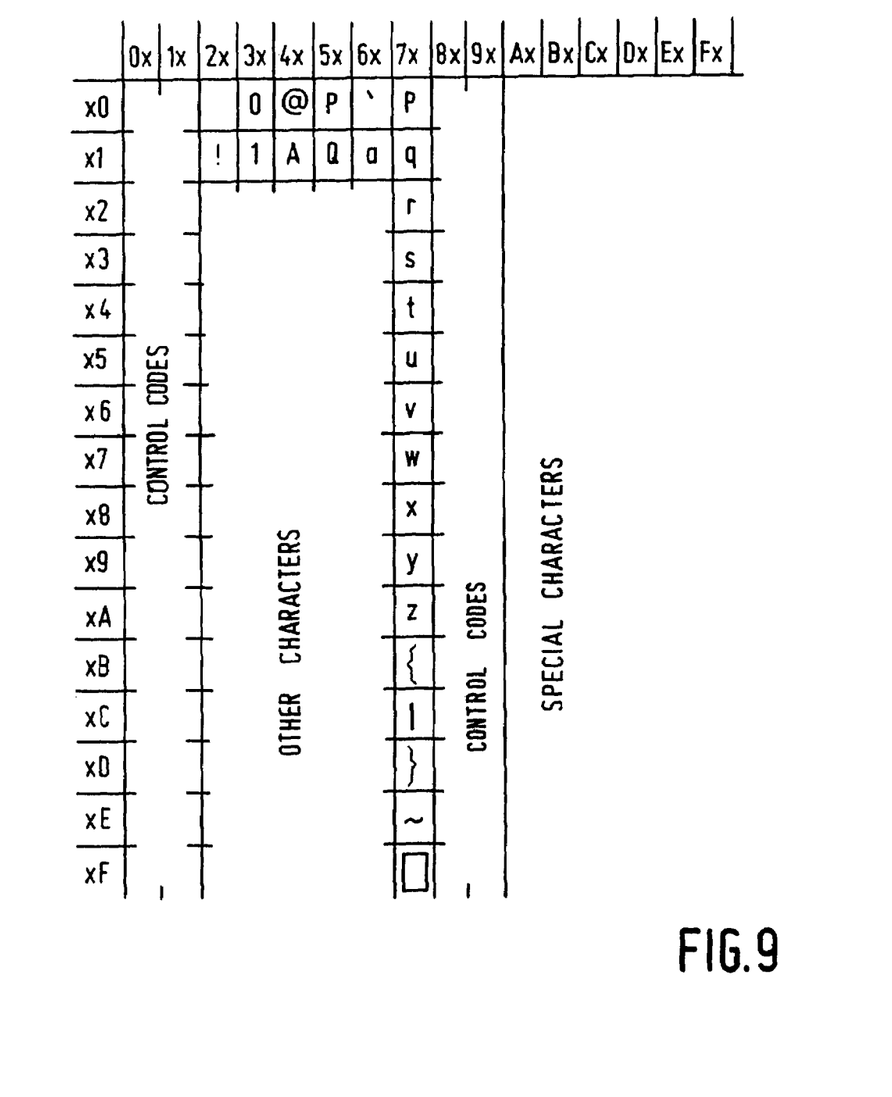
FIG. 9 shows a possible relation between the character codes and corresponding characters.

In the text packet forty bytes (bytes 8-47) are used for transferring the codes TLC0, . . . , TLC40 of the coded text line. The codes may comprise a character code defining a character of a character set. The codes may also comprise serial control codes for the control of the display. FIG. 9 shows the relation between the code values (hexadecimal) and the corresponding characters. The codes in columns 0x, 1x, 8x and 9x are reserved for the control codes. FIG. 4 shows an overview of the serial control codes used in the embodiment described. FIG. 4 shows two marking codes for marking groups of character codes to be used for displaying a text string. These marking codes comprises a start control code $\overline{S}$, which is used to indicate the begin of a text string to be displayed on the 1-line display unit, and a control code $\overline{P}$, which is used to indicate the end of a text string to be displayed on the 1-line display unit 10. Scrolling control codes H0, H1, H2 and H3 with the code values 19, 1A, 1B, and 1C are used for initiating a horizontal scroll with four different scrolling speeds.

Figure 6:
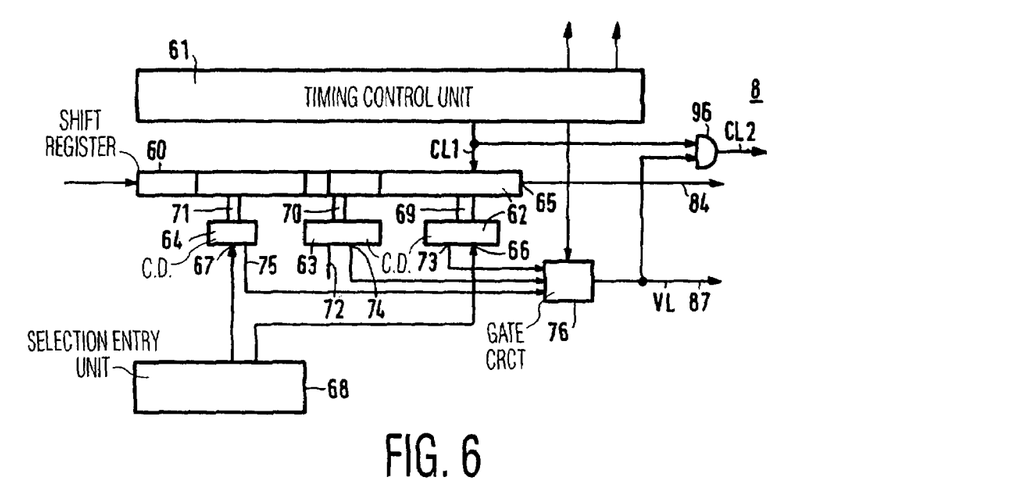
FIG. 6 shows an embodiment of an sub data processing unit for use in the system according to the invention.

FIG. 6 shows an embodiment of the sub data processing unit 8. The unit 8 comprises a memory in the form of a shift register 60 in which the bytes of the packets received from the input stage 6a are shifted in synchronism with a clock signal cl1 received from a timing control unit 61 of a usual type. The unit 8 is further provided with code coincidence detecting circuits 62, 63 and 64. The code coincidence detecting circuits 62 and 64 are provided with inputs 66 and 67 for receiving a user selected value for the language selection code LN and topic selection code TC from a user selection entry unit 68 of usual type, e.g. an operation panel with selection keys. The code coincidence detecting circuit 63 has an input 72 for receiving a code value corresponding with the code value of AP indicating that the corresponding coded text line comprises information to be displayed on the 1-line display unit 10. Inputs 69, 70 and 71 of the code coincidence detecting circuits 62, 63 and 64 are coupled with parallel outputs of the shift register 60 such that at the moment that the first byte of a received text packet reaches the serial output 65 of the shift register the values of the codes LN, AC and TC are supplied to the code coincidence detecting circuits 62, 63 and 64 respectively. The code coincidence detecting circuits 62, 63 and 64 are provided with outputs 73, 74 and 75 for supplying corresponding detection signals to a gate circuit 76 in the events that a coincidences between the code values on the inputs of the circuits 62,63 and 64 are detected. The gate circuit 76 is of a usual type that under control of the timing circuit 61 generates a load signal VL during the time that the codes of the coded text lines become available on the output 65 of the shift register 60 after detections of coincidences by all three code coincidence detecting circuits 62, 63 and 64. The load signal VL is supplied to an input of a two input AND-gate 96. The clock signal cl1 is supplied to the other input of the AND-gate 96, so as to obtain on the output of the AND-gate 96 a clock signal cl2 exclusively during the generation of the load signal VL. Both the clock signal cl2 and the load signal VL are supplied to the display control circuit 9.

The sub data processing unit 8 operates as follows:
In the event that the parallel control codes LN and TC correspond with the user selected values and at the same time the parallel control code AC indicates that the coded text line in the corresponding text packets comprises information to be displayed on the 1-line display unit 10, then the gate circuit 76 starts generating a load signal VL as soon as the first code of the coded text line reaches the output 65 of the shift register 60. As soon as the first parallel control of the next text packet reaches the output 65 the generation of the load signal VL is stopped.

Figure 7:
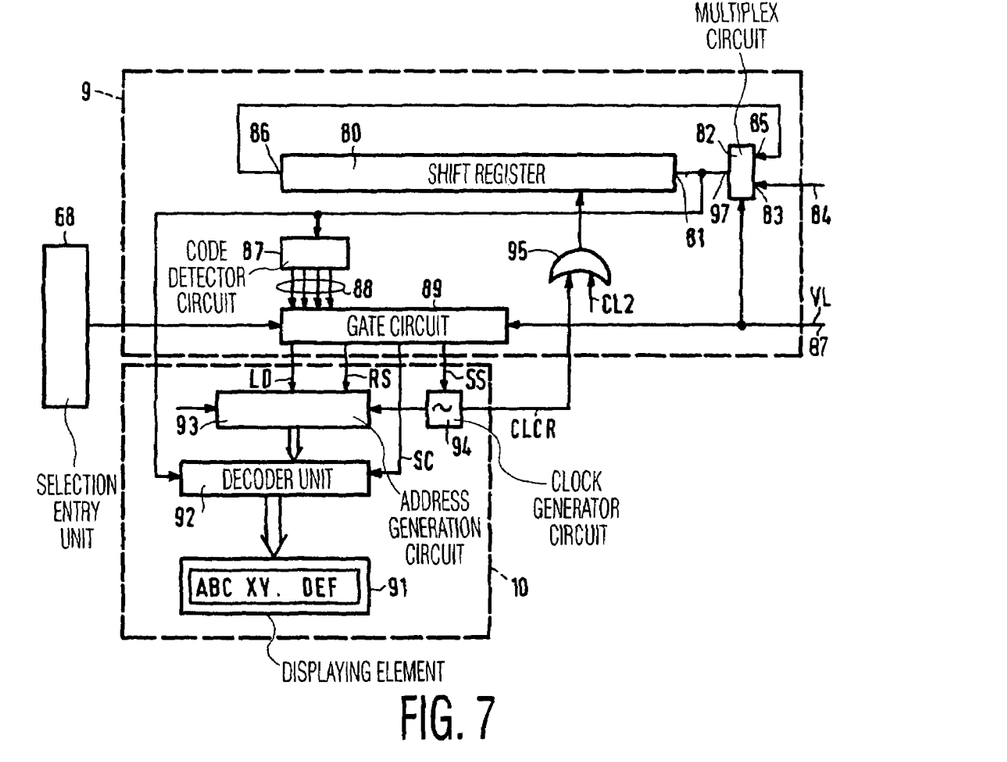
FIG. 7, shows embodiments of a display control unit an display unit for use in the system according to the invention.

FIG. 7 shows embodiments of the display control unit 9 and the display unit 10. The display control unit 9 comprises a shift register with a number of subsequent byte storage positions which is equal to the number of codes in the coded text lines. The shift register 80 shifts the codes received on an input 81 through the register to an output 86 in synchronism with either the clock signal cl2 received from the timing circuit via an OR-gate 95 or a clock signal clcr received from a clock generator 94 with an adjustable oscillating frequency. The input 81 is coupled with a two-input multiplex circuit 82. A first input 83 is coupled to the output 65 of the shift register 60 of the sub data processing unit 8 via a signal path 84. A second input 85 of the multiplex circuit 82 is coupled to the output 86 of the shift register 80. An output 97 of the multiplex circuit 82 is coupled to an input 81 of the shift register 80. The multiplex circuit 82 is controlled by the load signal VL which is supplied to a control input of the multiplex circuit 82 via a signal line 87. In the event that the signal VL indicates that a next coded line is available on signal path 84 the codes of this coded text line are fed via the multiplex circuit 82 to the input 81 of the shift register 80. At the same time the shift register 80 receives the clock signal cl2, so that the codes of the coded text lines, available on the output 65 are shifted into the shift register 80 in synchronism with the clock signal cl2. In the event that the load signal VL indicates that no codes of a coded text line with information to be displayed on the 1-line display unit 10 are available, the codes on the output 86 of the shift register 80 are supplied to the input 81 via the multiplex circuit 82.

The display control unit 9 is further provided with a code detection circuit 87 with an input coupled to the output 97 of the multiplex circuit. The code detection circuit 87 is of usual type which detects whether the code on the output 97 of the multiplex circuit 82 coincides with a serial control code or a character code defining a space. The detection circuit 87 generates a corresponding output signal when one of the codes mentioned hereinbefore is detected. Further the control signals generated by the detection circuit indicates which type of control code control code has been detected in the event that the detected control code corresponds with a start code S, a pause code P or one of the scroll control codes H0, H1, H2 or H3. These output signals are supplied via signal lines 88 to a gate circuit 89. Further the load signal VL is supplied to the gate circuit 89. Another input of the gate circuit 89 is coupled to an output of the user selection entry unit 68 for receiving a user entered scroll command. The gate circuit 89 derives control signals for the display unit 10 from the signals received at its inputs. The generation of a first control signal LD is started in response to the detection of the first character code not being a space code after the start of a generation of the load signal. The generation of the control signal LD is also started in response to the detection a start control code S. The generation of the control signal LD is stopped in response to the detection of a pause control code P. Further the control signal LD is generated during each detection of a pause control code P in order to achieve that a "space"-character is displayed for each pause code. The control signal LD indicates that a character is to be displayed on the next empty character position of a 12-digit displaying element 91 of the display unit 10. A second control signal SC is generated in response to a detection of one of the scroll control codes H0, H1, H2 or H3 or in response to a user entered scroll command. The control signal Sc indicates that a horizontal scroll of characters corresponding with the subsequent codes outputted by the shift register 80 is requested on the displaying element 91. A third control signal RS, which is generated in response to the load signal VL, indicates that the displaying element 91 is to be cleared. The control signal RS is also generated in response to the first detection of the start control code S in the coded text line. Further the generation of the control signal SC is stopped in response to the load signal VL and the generation of the control signal LD is started in response to the load signal. A fourth control signal SS indicates the desired scrolling speed.

The output 97 of the multiplex circuit 82 is coupled to an input of a decoder unit 92. The decoder unit 92 is provided with a shift register for storing the character codes of the characters to be displayed. Further the decoder unit is provided with a decoder for converting the character codes stored in the shift register into control signals for the respective digits of the displaying element 92. The decoder is of a usual type which causes the display of a space for serial control codes which does not define a character, such as the pause code P. The shift register of the decoder unit 92 is of a usual type that in response to the signal SC causes a shift of the character codes received through the shift register, so as to achieve a horizontal scroll of the characters over the display element 91. The shift of the codes through the shift register 80, and the shift register of the decoder unit is controlled by a clock circuit 94. In absence of a signal SS the clock circuit 94 the output of a clock signal of the clock circuit is disabled. In the event that a signal SS is present, then the output of the clock signal is enabled and a clock signal with a frequency defined by the signal value of the signal SS is supplied directly to the clock input of the shift register of the decoder unit 92 and via OR-gate 95 to the shift register 80. In absence of the signal SC the shift register of the decoder unit is brought in a static mode in which characters can be loaded in a memory locations addressed by an address generation circuit 93. The address generating circuit is of a usual type that indicates the next empty memory location of the shift register in the decoder unit 92. In the event that all available memory locations are used for storage of codes the loading of newly supplied cods are not stored any more.

The operation of the display control unit 9 and the display unit 10 will be described hereinafter. In the event that the load signal VL indicates that on the output 65 the codes of a next coded text line are available, then multiplex circuit 82 is brought in a state in which the codes on the output 65 are supplied to the input of shift register 80. Consequently all codes of the coded text line are shifted into the shift register 80. These codes are also supplied to the detection circuit 87 and the input the decoder unit 92.

Figure 8A:
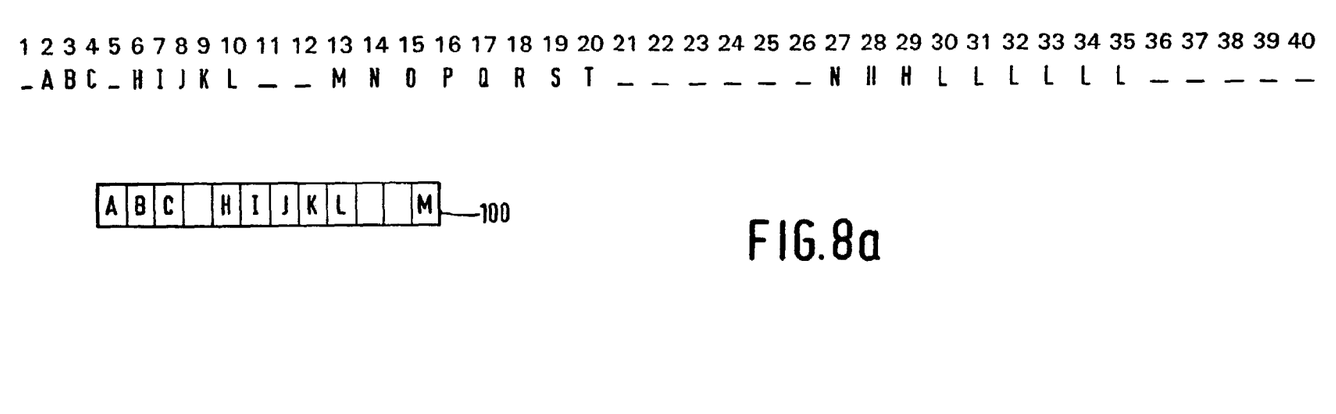
FIGS. 8a, 8b, 8c and 8d show different coded text lines and character strings displayed in response to the receipt of these coded text lines.

The detection circuit 87 supplies signals to the gate circuit 89 indicating the type of code supplied to input of the decoder circuit 92 of the display unit 10. Since the gate circuit starts to generate the load control signal LD in response to the detection of the first character code not being a space character, the decoder circuit 92 starts loading characters in its shift register from the first memory location onwards, leading space codes and control codes not being one of the control codes shown in FIG. 4 being ignored for loading. In order to illustrate this loading process reference is made to FIG. 8a. This figure shows a coded text line of forty codes, which are indicated by the characters defined by the codes. A space code is indicated by the symbol "_". The result of the receipt of this coded text line on the 12 digits displaying element 91 is shown within a window 100. The displaying element 91 shows the representations of the character codes on the positions 2-13 in the coded text line. The space on the first position of the coded text line is ignored.

Figure 8B:
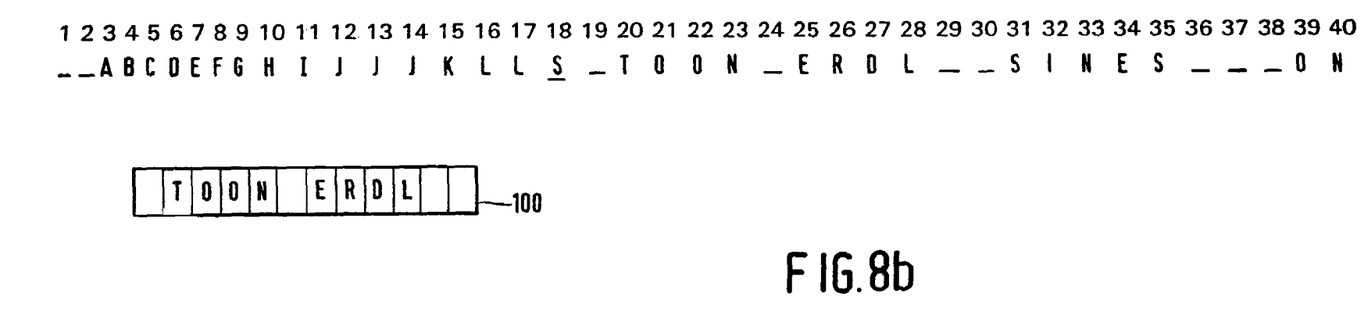

FIG. 8b shows another coded text line. This coded text line comprises the pause control code S on position 18 of the coded text line. When this coded text line is supplied to the display control unit 9 this results in that firstly characters defined by the codes on the positions 3-14 are displayed. However as soon as the start control code S is detected the display is reset and characters defined by the codes on positions 19-30 are displayed in window 100.

Figures 8C, 8D:
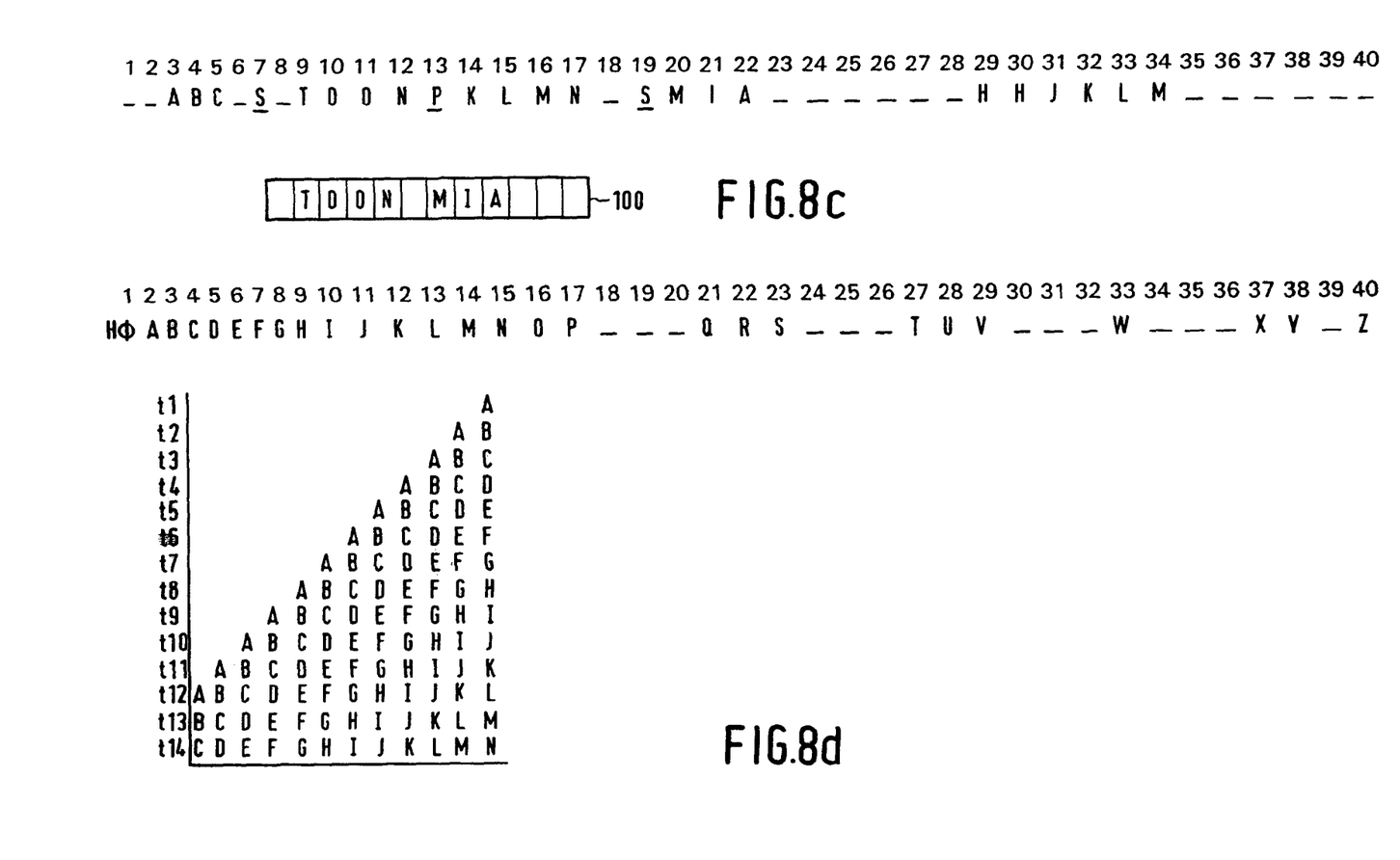

FIG. 8c shows a coded text line in which the start control code S on position 7 is followed by the pause control code P on position 13 in the coded text line. The coded text line further includes a further start control code S on position 19. This result in that the string of characters defined by the character codes between the first start control code S and the pause control code P are displayed. Further the pause control code P causes the display of a space after this character string.

As soon as the start control code S on position 19 is detected the loading of character codes in the decoder circuit 92 is resumed until all twelve available memory location of the decoder circuit are occupied.

FIG. 8d shows a coded text line which includes the scroll control code H0 on the first position. In response to the detection of the scroll control code H0 the display unit is brought in the horizontal scrolling mode. Further after the coded text line received is loaded completely into the shift register 80, the multiplex circuit 82 is brought in a state in which the output 86 of the shift register 80 is fed to its output 97. The clock generator 94 is set to a frequency corresponding to the value indicated by the control code H0. Consequently a horizontal scroll of the character string defined by the coded text line is realized. The contents of the twelve digit display element on subsequent clock moments t1, . . . , t14 is also shown in FIG. 8d. After the scroll of the complete character string defined by the coded text line has been finished a next horizontal scrolling sequence may be initiated again. These repeating scrolling sequences may be continued until the receipt of the next coded text line without scrolling control codes.

A horizontal scrolling sequence for displaying the text defined by an arbitrary one of the coded text lines received can also be initiated by means of a user entered scroll command, because each coded text line comprising information to be displayed on the 1-line display unit 10 is stored completely in the shift register 80. In response to a user entered scroll command the control signal SC is generated. Consequently the codes of the coded text line available in the shift register 80 are shifted into the decoder unit 92 so as to achieve a horizontal scroll of the corresponding text on the twelve digit display element 91.

It is to be noted that other scrolling methods as described hereinbefore may be implemented.

A non-limitative overview of suitable scrolling methods will be discussed hereinafter.

The decoder unit may cause a skip of leading and/or trailing spaces, or it may cause a continuous scroll until the last character is moved out of the display area. A Soft Scroll (character-column wise), Character Scroll (character by character) or Word Scroll (word by word) mode may be used.

Two ways of activating the scrolling may be implemented: automatically or on a user command. Automatic scrolling shall not be activated if a "non-scrolling" code is included in a text line. The scrolling may be controlled automatically. This means that the full text is scrolled without any user interaction. Depending on the design of the hardware, various scrolling methods may be implemented, e.g.

- the text is scrolled again and again,
- the text is scrolled once, until the last character is moved out of the display area. This method is to be used exclusively for text lines of which the Packed Index equals "00 00h".
- the text is scrolled once, after which the beginning of the text is shown again on the display.
- the text is scrolled once, after which the text marked by the start control code S and the pause control code P controls is shown on the display.
- the text as marked by the control codes S and P is shown first for a (device dependent) period of time, after which one of the above mentioned scrolling methods starts.

The scrolling may also be controlled manually. This means the text as marked by the S and P is displayed until a user's scroll command is received. Depending on the design of the hardware various reactions on a user's scroll command may be implemented, e.g.:

- the text is scrolled once, after which the end of the text is left on the display. This method is to be used for text lines of which the Packet Index equals "00 00h".
- the text is scrolled once, after which the beginning of the text is shown again on the display.
- the text is scrolled once, after which the text marked by the control codes S and P is shown on the display.

The embodiment of the receiver as described hereinbefore is realized as a so-called hard-wired circuit. However it will be clear to the skilled man that embodiments realized by means of so-called program controlled circuits are also possible. Further it is to be noted that the invention is not limited to the use of the serial control codes as described. Other serial control codes for the control of the representation of character strings on a 1-line display with a limited number of digits are also possible. Further the response of the display control unit on the serial control codes may be different.

Finally it is remarked that the display unit may be incorporated in a remote controller of the receiver 1.

The invention claimed is:

1. A non-transitory record carrier for storing information readable by a processor, the information comprising main data and sub data, the sub data comprising coded text lines having a plurality of character codes, wherein the coded text lines comprises control codes for controlling the processor to display characters representing the coded text lines on a display unit configured to display at least one line of characters, the at least one line having a predetermined number character positions which is less than a number of characters in the coded text lines, wherein a selected number of the character codes are displayable at the predetermined number of character positions of the at least one line, wherein the control codes are intermixed among the plurality of character codes.

2. The non-transitory record carrier as claimed 1, wherein the control codes comprises horizontal scrolling control codes for controlling the processor to provide horizontal scrolling of characters representing the coded text lines.

3. The non-transitory record carrier as claimed in claim 2, wherein the control codes comprise scrolling speed codes for controlling the processor to regulate the scrolling speed of the characters.

4. The non-transitory record carrier as claimed in claim 1, wherein the control codes comprises marking codes for marking groups of characters to be displayed on the display unit with a limited number of display positions to control the processor to regulate which characters are displayed depending on a capacity of the display.

5. The non-transitory record carrier as claimed in claim 4, wherein the marking codes comprise a start code preceding the marked group of characters, and pause code following the marked group of characters.

6. The non-transitory record carrier as claimed in claim 1, wherein the sub data comprise text packets, each of the text packets comprises a coded text line and additional control codes for controlling the operation of the processor, a part of the text packets comprising an indicating control code indicating that the corresponding packet comprises a coded text line with text information to be displayed on the display unit.

7. The non-transitory record carrier of claim 1, wherein the control codes comprises a first set of control codes, and wherein leading space codes and control codes not being one of the first set of control codes are ignored when loading codes into a memory for display on the display unit.

8. The non-transitory record carrier of claim 1, wherein the first set of control codes comprises a start code, a pause code and horizontal scrolling speed codes.

9. The non-transitory record carrier of claim 8, wherein the start code resets the display unit so that a next character after the start code is displayed on a first position of the at least one line of the display unit.

10. The non-transitory record carrier of claim 9, wherein the pause code causes a display of a space.

11. The non-transitory record carrier of claim 8, wherein the start code and pause code mark a beginning and an end of a group of characters to be displayed on the display unit.

* * * * *